US006847850B2

(12) United States Patent
Grumelart (10) Patent No.: US 6,847,850 B2
(45) Date of Patent: Jan. 25, 2005

(54) PROCESS CONTROL LOOP ANALYSIS SYSTEM

(75) Inventor: Alain Grumelart, St. Hubert (CA)

(73) Assignee: Invensys Systems, Inc., Foxboro, MA (US)

(*) Notice: Subject to any disclaimer, the term of this patent is extended or adjusted under 35 U.S.C. 154(b) by 243 days.

(21) Appl. No.: 10/138,922

(22) Filed: May 6, 2002

(65) Prior Publication Data

US 2003/0014130 A1 Jan. 16, 2003

Related U.S. Application Data

(60) Provisional application No. 60/288,431, filed on May 4, 2001.

(51) Int. Cl.[7] .............................................. G05B 13/02
(52) U.S. Cl. ............................ 700/37; 700/19; 700/20; 702/180; 702/187; 707/7; 707/102; 706/906
(58) Field of Search ............................. 700/12, 19, 20, 700/32, 47, 48, 49, 9, 10, 37, 117, 42–44; 702/187, 179, 180; 327/378, 362, 513, 518; 318/561; 706/903, 906

(56) References Cited

U.S. PATENT DOCUMENTS

| 5,067,099 A | 11/1991 | McCown et al. |
| 5,122,976 A | 6/1992 | Bellows et al. |
| 5,223,207 A | 6/1993 | Gross et al. |
| 5,249,119 A | 9/1993 | Kaseda et al. |
| 5,384,698 A | 1/1995 | Jelinek |
| 5,488,561 A | 1/1996 | Berkowitz et al. |
| 5,581,459 A | 12/1996 | Enbutsu et al. |
| 5,629,872 A | 5/1997 | Gross et al. |
| 5,719,788 A | 2/1998 | Seborg et al. |
| 5,748,469 A | 5/1998 | Pyotsia |
| 5,812,428 A | 9/1998 | Zou et al. |
| 5,838,561 A | 11/1998 | Owen |
| 6,017,143 A | 1/2000 | Eryurek et al. |
| 6,047,220 A | 4/2000 | Eryurek |
| 6,073,089 A | 6/2000 | Baker et al. |
| 6,088,665 A * | 7/2000 | Burns et al. ................. 702/188 |
| 6,110,214 A | 8/2000 | Klimasauskas |
| 6,119,047 A | 9/2000 | Eryurek et al. |
| 6,574,522 B1 * | 6/2003 | Douglas ..................... 700/109 |
| 6,615,090 B1 * | 9/2003 | Blevins et al. ............... 700/26 |
| 6,718,234 B1 * | 4/2004 | Demoro et al. ............. 700/269 |
| 6,728,262 B1 * | 4/2004 | Woram ....................... 370/466 |
| 6,784,973 B1 * | 8/2004 | Wozniak et al. .............. 355/40 |
| 2001/0032025 A1 * | 10/2001 | Lenz et al. ................... 700/28 |
| 2001/0053940 A1 * | 12/2001 | Horn et al. ................... 700/32 |

OTHER PUBLICATIONS

US Pub. No. 2002/0038300 A1 to Iwata et al.*
US Pub. No. 2002/0165699 A1 to Ling et al.*

* cited by examiner

*Primary Examiner*—Anthony Knight
*Assistant Examiner*—Crystal J Barnes
(74) *Attorney, Agent, or Firm*—Fish & Richardson, P.C.

(57) ABSTRACT

The system and method disclosed herein allow a user to retrieve data from various process control loops and organize that data in dynamic manner to allow for multiple types of data analysis. A user may associate individual process control loops into groups and analyze the data and impact of select process control loops in those groups. Since the associations of process control loops into groups can be done dynamically, the user is able to easily reconfigure groups (i.e. add or remove process control loops) and redo the analysis. Another feature is the storage of both the data retrieved and the results of the analysis so that comparisons can be performed and reports can be generated.

20 Claims, 3 Drawing Sheets

PROCESS CONTROL LOOP ANALYSIS SYSTEM

CROSS-REFERENCE TO RELATED APPLICATION

This application claims priority from U.S. Provisional Application No. 60/288,431, filed May 4, 2001, and titled PROCESS CONTROL LOOP ANALYSIS SYSTEM which is incorporated herein by reference.

TECHNICAL FIELD

This application relates to process control analysis systems, and more particularly to a system for analyzing process control loops.

BACKGROUND

A process control loop is generally comprised of three elements. The first element is a sensor that determines a condition. One example of a sensor is a temperature sensor. The second element typically performs an action. This element may perform a task to alter a condition and may include, for example an actuator that opens a valve to allow more water into a process, or a motor or pump to move an element through a process. The third element is a process control device, for example, a distributed control system (DCS) or programmable logic controller (PLC) coupled between the sensor and the actuator. The process control device receives data from the sensor, and may receive data from the actuator, and makes a decision that causes the actuator to function. Process control devices typically include a computer, controller or a microprocessor chip that executes for example a PID control loop algorithm that operates to maintain a temperature value at a desired setpoint.

Process control loops are known to operate below their expected efficiency, or even malfunction. This malfunction may be caused by a sensor or actuator. In addition, the process control device may receive correct data, but due to a programming problem, may make an improper decision and cause the actuator to take action when it otherwise should not. The process control loop also may operate at a lower efficiency when not properly tuned.

In many applications, a plurality of process control loops are coupled together. As an example a paper mill may include hundreds, if not thousands, of process control loops that are used in the production of paper. In these larger systems it is important for each process control loop to operate properly and efficiently. A malfunction in one process control loop will likely impact the performance of downstream process control loops. Two or more process control loops also may interact with each other. The maintenance and monitoring of the mill's process control loops becomes more complicated as the number of process control loops increases.

SUMMARY

Implementations of the present loop analysis system may take data from process control loops via data historians that make the data identifiable and store it. Once stored, the data may be used in calculations to determine the performance of not only individual process control loops, but also groups of process control loops as a whole. In one implementation, the groups of process control loops to be analyzed are selected through a user interface.

One advantage of the present implementations of the loop analysis system is the ease with which a user may reconfigure groupings of process control loops. That is, a user may analyze a first group of process control loops A, B and C and then analyze a second set of process control loops that includes process control loops A, B and D.

Another advantage of the disclosed system or method is the ability to monitor larger plants, and hence more control loops, with fewer instrumentation engineers. The level of automation attainable allows instrumentation engineers to monitor the results of the calculations from a centralized location. This saves the engineers from having to travel across the plant and take readings from a plurality of devices and then manually input the collected data into an analysis program.

Yet another advantage of the disclosed system or method is the ability to cross correlate among a plurality of process control loops from one location. That is, if a loop is malfunctioning or is operating out of a desired range, process control loops upstream of that particular process control loop can be analyzed to determine if they are malfunctioning and if this malfunction is the cause of the malfunction in the downstream process control loop.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
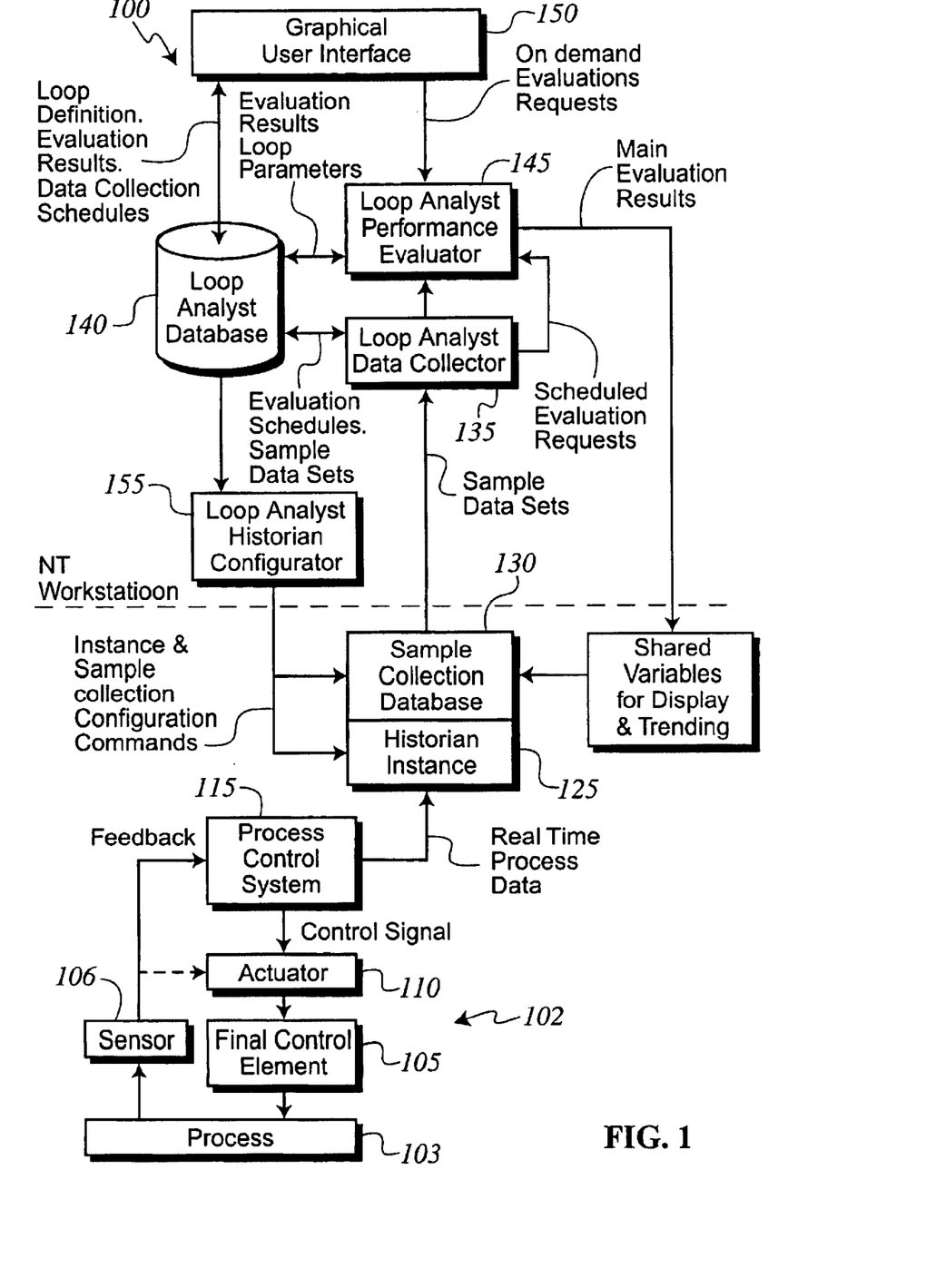
FIG. 1 is a block diagram of an exemplary process control loop analysis system.

FIG. 1 shows a process control loop analysis system 100 for analyzing and reporting real-time process control loop data from a process control loop 102 that is operated by a process control device or system 115. The loop analysis system 100 is connected to a data historian 125 that collects real-time process control data from the process control system 115. The process control loop 102 includes one or more final control elements 105. The final control element 105 performs a function associated with a process 103 that may involve a plurality of functions. Typically, the final control element 105 is a mechanical device that performs a mechanical function. Examples of final control elements 105 include valves, flow or transport devices, heat sources, heat sinks, conveyor belts, etc. An actuator 110 may be connected to the final control element 105. Actuator 110 causes the final control element 105 to operate (e.g., an actuator turns on a heater to dry a material). A sensor 106 is coupled to process 103 and may determine the effect that operation of the final control element 105 has on the process 103 (e.g., a temperature sensor measures the temperature of the drying material). Thus, the process control loop 102 is represented by the portion of process 103 controlled by end control element 105, actuator 110, sensor 106, and the process control system 115.

The process control device or system 115 is coupled to sensor 106 and actuator 110. The process control system 115 generally monitors and/or controls the final control element 105, typically via a PID control algorithm that maintains a desired setpoint by receiving feedback signals from the sensor 106 and sending a control signal to the actuator 110 to maintain the desired setpoint. In operation, the process control system 115 receives data from sensor 106, determines if an adjustment is necessary and adjusts final control element 105 via actuator 110.

The process control system 115 is connected to the data historian 125 for bi-directional data communication and forwards real-time process control data regarding the process control loop 102. The data historian 125 is configured to receive the reading of sensor 106 and the adjustments made to final control element 105 via actuator 110. The historian 125 also may receive an indication of the type of decision the process control system 115 made when it actuated the actuator 110.

The data historian 125 may receive data relating to only one process control loop or relating to a plurality of process control loops. When the data historian 125 is coupled to receive data relating to a plurality of process control loops, it can be used to organize the received data as will be described in more detail below.

The data historian 125 performs functions such as providing an interface between the process control system 115 and the loop analysis system 100 and may reformat the data it receives so it can be analyzed with data from other devices and other processes. In one implementation, the data reformatted by the historian 125 is stored in a sample collection database 130 that may form part of the historian 125, or may be a separate storage device configured to communicate with the data historian 125. The sample collection database 130 is one level of hierarchy in the storage of data that gives the user flexibility in determining when to collect data and how much data to pass on for evaluation. The data (or samples of data) stored in sample collection database 130 may be retrieved by a loop analyst data collector 135. Data collector 135 periodically or in response to a specific received instruction, requests data from the sample collection database 130. The data retrieved by the data collector 135 is forwarded to a loop analyst database 140 for storage. In another related implementation, the real-time process control data may be stored within the data historian 125, thus eliminating the need for the sample collection database 130. In this implementation, the loop analyst data collector 135 may retrieve the process control data directly from the data historian 125.

When the data collector 135 retrieves data, it forwards and stores this data to the loop analyst database 140. A loop performance evaluator 145 is also coupled to the loop analyst database 140. The loop performance evaluator 145 retrieves data from loop analyst database 140 for analysis and generates loop performance results. The results of the performance analysis are also stored in the loop analyst database 140.

A graphic user interface (GUI) 150 is coupled to loop analyst database 140 and the loop performance evaluator 145. GUI 150 includes the main software control program for implementing the loop analysis system 100 and allows a user to control the functionality of the loop performance evaluator 145 as well as to access data stored in the loop analyst database 140. A loop analyst historian configurator 155 is coupled to databases 130 and 140 and is also coupled to the data historian 125. The configurator 155 retrieves data from loop analyst database 140, in conjunction with instructions received from the GUI 150, and uses that data and instructions to configure the operation of the data historian 125 and optionally, the sample collection database 130.

The loop analysis system 100 shown in FIG. 1 may be implemented in a plurality of ways. In one implementation the data historian 125 is a software module that resides on the process control system 115, with the sample control database 130 either forming an integral part of the process control system 115 (i.e. a hard drive) or being maintained separated from the process control system 115. In yet another implementation, the data historian 125 and sample collection database 130 reside on a host computer separate from the process control system 115. One exemplary data historian that may be coupled to and used with the loop analysis system 100 is the AIM*Historian (TM) available from Invensys Systems, Inc. A network connection coupled between the data historian 125 and the process control system 115 allows for high speed bi-directional data communication. In this implementation, the data historian 125 is able to communicate with a plurality of process control systems 115 and collect data from a plurality of process control loops 102 as is described below.

In one implementation, data collector 135, loop performance evaluator 145, GUI 150 and configurator 155 are all software modules residing on a server or workstation that implements the loop analysis system 100, and the loop analyst database 140 provides, in addition to other functions described below, a wide range of data storage for the loop analysis system 100. Typically, the workstation communicates with the host computer that the data historian 125 resides on, as well as the sample collection database 130, through a network. The network allows a single workstation, with the modules described above, to communicate with a plurality of data historians 125 and sample collection databases 130 as is described below.

Process Control System 115

In many applications, the final control element 105 and sensor 106 may operate continuously. If the final control element 105 is coupled to an actuator 110, the actuator 110 may operate continuously with the final control element 105. In this environment, the process control system 115 may regularly receive data produced by sensor 106 and may regularly output control instructions to the actuator 110. In addition, the process control system 115 also may receive data from the actuator 110. This feedback of data from the sensor 106 (and optionally the actuator 110) to the process control system 115 allows the process control system 115 to make a determination at that moment if process control loop 102 is operating properly. That is, if sensor 106 is transmitting data indicating that valve 105, for example needs to be opened more, and actuator 110 cannot open valve 105 beyond its current set point then an alarm can be sounded by the process control system 115 indicating to the plant personnel that a problem exists with process control loop 102.

Another function of the process control system 115 is to identify the source of the real-time control data. That is, as data is forwarded to the data historian 115, the process control system 115 attaches to that data a designator identifying the data as originating from sensor 106, actuator 110 or process control system 115, along with a time stamp. The data along with the associated designation is stored in the sample collection database 130 associated with the data historian 125, or may be stored directly within the data historian 125.

Historian Module 125 and Database 130

The data historian 125 supports the collection, storage, and retrieval of data associated with the process control system 115 and the process control loops 102. Typically, the data historian 125 works in conjunction with a variety of applications that are able to analyze and distribute process control system information. One particular application is the loop analysis system 100. The data historian 125 may be distributed within a process control system environment, or reside on an information network system with unified configuration and management. In addition to serving as a plant-wide data repository, the data historian 125 generally includes connectivity options to a wide selection of automation systems (e.g. DCS, PLC) and databases via a family of data collectors that include configurable hardware/software interfaces called I/O Gates. The I/O Gates may include both configurable hardware and configurable software interfaces that enable a consistent means to collect real-time process control data from virtually any process system, process control device, and/or process control system 115. For example, when the data historian 125 is connected to the process control system 115, the appropriate I/O Gate is selected by the historian 125 for communicating with that particular process control system 115. The data historian 125 is then capable of receiving real-time process control data from the process control system 115 via the I/O Gate. Additionally, the data historian 125 may use other I/O Gates to simultaneously communicate with and receive data from multiple process control systems. The I/O Gate may allow for automatic configuration of the communication link and protocol between the historian 125 and the process control system 115 by examining the tags associated with the process control data. In other implementations, the I/O Gate may retrieve configuration settings that are set by the system user.

The combination of the data historian 125 and its associated I/O Gates connected with the loop analyst system 100 allows the loop analyst system 100 to analyze and further process the real-time process control data from any type of process control device or process control system 115 that is capable of communicating with the data historian 125. Thus, a significant advantage of the loop analysis system 100 is that a single installation of the loop analysis system 100 can evaluate the performance of hundreds or more process control loops 102 by way of the historian 125 collecting the real-time process control data from multiple process control systems 115 located throughout a manufacturing or processing facility.

The data historian 125 may receive a wide range of data from the process control system 115. This data may include measurement data generated by the sensor 106, control signal data sent by the process control system 115 to the actuator 110 to maintain a desired setpoint, adjustments and calculations made by the process control system 115, as well as the actual setpoint data that corresponds with the measurement and control signal data via a time stamp. The data historian 125 retrieves this data and forwards it to sample collection database 130. As the data is retrieved from process control system 115, the data historian 125 identifies that data as being associated or retrieved by that particular historian. Thus, as will be described later, if a user searches for data retrieved by one historian, the user will receive results indicative of all the data retrieved by that historian. In typical applications, the data historian 125 collects data associated with related process control loops 102. An example is a valve/hygrometer loop for adding water to a slurry and a heater/temperature sensor loop for warning the slurry to a desired temperature. These two exemplary process control loops are related to each other in that if the valve/hygrometer loop adds too much water to the slurry, the heater will have to output more heat to raise the slurry to the correct temperature as measured by the temperature sensor. These two process control loops are therefore related. In such applications, it is desirable to collect and analyze data from both the valve/hygrometer loop and heater/temperature sensor loop together as the operation of one loop impacts upon the operation of the other loop.

In the exemplary implementation shown in FIG. 1, the sample collection database 130 is coupled to the data historian 125 and may reside on the same host computer, or may be part of a separate computer. The sample collection database 130 is the first tier of the data storage hierarchy. That is, the data historian 125 can decide what portions of data it receives from process control system 115 to store in sample collection database 130. The user may use GUI 150 to select how much data the data historian 125 retrieves from process control system 115. In this way, the user may instruct the data historian 125 to retrieve more real-time process control data during a given time period or to retrieve less process control data during other time periods.

In order to provide additional flexibility in the communication between the data historian 125 and the loop analysis system 100, the configurator 155 may instantiate the data historian 125. Through the instantiation process, the data historian 125 is able to receive the data transmitted to it by the process control system 115 and process this data so it may be used more effectively by the loop analysis system 100.

Data Collector Module 135

The data collector software module 135 retrieves data from the sample collection database 130 on a periodic basis. The time period for retrieval is set by the user and stored in the loop analyst database 140. In one exemplary implementation, the data collector 135 checks the time period value stored in the loop analyst database 140, and compares it with the elapsed time since the data collector 135 last retrieved data from the sample collection database 130. If the data collector 135 determines it is time to retrieve additional data from the sample collection database 130 (or directly from the data historian 125), the data collector 135 issues a request to the database 130 (or the data historian 125). The request typically includes a field indicating what time frame of data the data collector 135 would like to retrieve.

In the implementation shown in FIG. 1, the data collector 135 collects data associated with one process control loop 102. It should be noted that in other implementations, the data collector 135 may be coupled to a plurality of sample collection databases 130 and receives data from those plurality of sample collection databases 130.

Once the data collector 135 has assembled all of the requested data, either associated with a single process control loop 102 or a plurality of process control loops, it forwards the collected data to the loop analyst database 140 for storage. In another implementation, the data collector 135 may retrieve the real-time process control data directly from the data historian 125 and store this data directly in the loop analyst database 140. In alternative implementations, the data collector 135 may forward the data it retrieves directly to the loop performance evaluator 145 for immediate evaluation.

Figure 2:
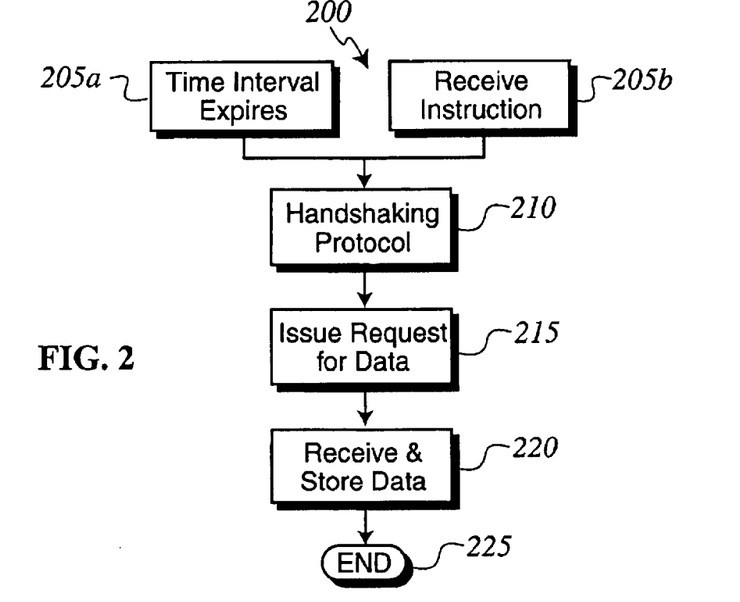
FIG. 2 is a flow chart of a process for collecting data.

An exemplary flowchart 200 for a process that the data collector 135 executes is shown in FIG. 2. The process begins when either a time interval expires (step 205a) or when the data collector 135 receives an instruction to retrieve data immediately (step 205b). The data collector 135 goes through a handshaking protocol to allow for proper transmission and reception of data (step 210). The data collector 135 then issues a request for data from the sample collection database 130, or depending upon the particular implementation, directly from the data historian 125 (step 215). As noted earlier, this request may include a time frame so that the sample collection database 130 or data historian 125 only forwards a select amount of data from it's extensive data repository. Once the data is received, the data collector 135 forwards the data to the loop analyst database 140 for storing (step 220). The process then ends (step 225).

Loop Analyst Database 140

The loop analyst database 140 receives data from one or more data collectors 135. Once the loop analyst database 140 receives this data it stores it. When the loop analyst database 140 receives requests for data, it forwards that data to the requester. The requester may either be GUI 150 or performance evaluator module 145. The loop analyst database 140 maybe any of a number of types of databases. Examples include a relational database, an object oriented database or a distributed database.

The loop analyst database 140 stores and forwards several different types of data. One type of data stored and forwarded by the loop analyst database 140 is data associated with either a sensor 106 or an actuator 110, and also may include setpoint data for that particular time instance. In order to maintain all of the received data in an organized manner, the data is stored with a descriptor that designates from which process control loop the data originated. As will be explained below, other descriptors may include tag names associated with the data historian 125 or the process control system 115.

In addition to the descriptors, the data stored in database 140 also may include the numeric value and the units data (i.e. gallons, feet, percentage, etc) associated with the process control loop 102. This data is used in calculations by the performance evaluator module 145 and displayed to the user via GUI 150.

The second type of data stored and forwarded in one implementation of the loop analyst database 140 is control loop and group description parameters. That is, each process control loop 102 is identifiable by a particular designation associated with it. This process control loop designation is also stored in the loop analyst database 140. The user may use this designator to select that particular process control loop 102 for analysis or displaying of results related to that process control loop 102. In one implementation, this descriptor is associated with the process control system 115 that handled the raw data. In other implementations, the descriptor is associated with a particular sensor 106 or actuator 110. In addition, group designators are also provided that identify groups of process control loops 102 for data retrieval and evaluation. In this way, a user many request to retrieve data from a plurality of process control loops 102 as defined by a group designator.

A third type of data stored in and forwarded by the loop analyst database 140 is evaluation results data generated by the performance evaluation module 145. As will be described in more detail below, the performance evaluation module 145 performs calculations on the data it receives from the loop analyst database 140. Once these results are calculated by the performance evaluation module 145, they are stored in the loop analyst database 140.

The loop analyst database 140 also stores data collection and evaluation scheduling information. As noted above, each process control loop 102 has its own timetable for having its data collected by the data collector 135. There are also other timetables for determining when the collected data is evaluated (i.e., every hour, once every twenty-four hours, etc.). These timetables are stored in the loop analyst database 140 and are used by the data collector 135 to collect the data, and are used by the loop performance evaluator module 145 to initiate evaluations of the process control loops 102.

The loop analyst database 140 is a second level of hierarchy of data storage. The loop analyst database has the capability to organize data into groups from a plurality of different process control loops 102. This allows the user or performance evaluator module 145 to request data by using a group descriptor. This saves from having to select which process control loops 102 need evaluation and asking for their respective data individually. By having the process control loops 102 organized into groups, the user will also be able to determine how the operation of one process control impacts the other(s) in the group.

Loop Performance Evaluator Module 145

The loop performance evaluator module 145 analyzes the data it receives. In some implementations the loop performance evaluator module 145 receives data from loop analyst database 140 or directly from the collector module 135. There are several analysis processes that the performance evaluator module 145 may perform. For example, the performance evaluator module 145 may analyze the process control loop data using auto-correlation, power spectrum regression, or Harris indices analysis. These analysis techniques are further described in U.S. Pat. No. 5,838,561, assigned to the Pulp and Paper Research Institute of Canada, and which is incorporated herein by reference.

Figure 3:
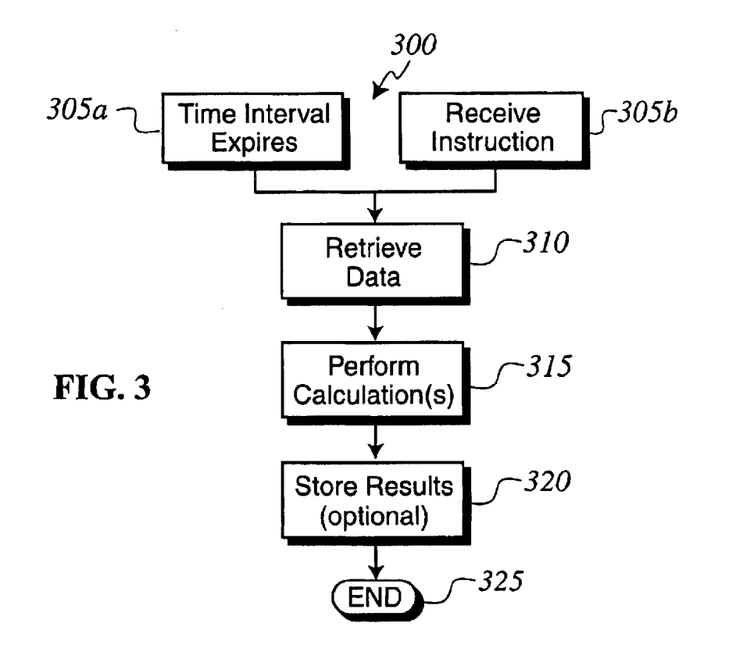
FIG. 3 is a flow chart of a process for evaluating data.

The performance evaluator module 145 may operate in accordance with a process that is represented by flowchart 300 in FIG. 3. There are two ways to initiate an analysis of data. The process begins when either a time interval expires (step 305*a*) or when the performance evaluator 145 receives an instruction to evaluate data immediately (305*b*). Once initiated, the performance evaluator module 145 retrieves the data needed to perform the evaluation (step 310). The performance evaluator module 145 may request the data from loop analyst database 140 or receive if from the data collector 135. Once the performance evaluator module 145 has the data, it performs the requested analysis (step 315). After the results are calculated, performance evaluator module 145 may forward the results to the loop analyst database 140 for storage (step 320). This step is optimal because a user may request analysis on the spot, via GUI 150, and not want results of that analysis stored. In some implementations when the analysis is performed automatically after a time interval expires (see step 305*a*), the results are automatically stored in the loop analyst database 140. The process then ends (step 325).

In some implementations the performance evaluator module 145 outputs results to the sample collection database 130. This allows for a user at the sample collection database 130 to view the results and determine if any trends are occurring in the data. In any of the above implementations, the user may then make adjustments to the process control loop 102 to improve either an individual loop's or a group's performance.

Graphical User Interface 150

The graphic user interface (GUI) 150 performs several functions within the loop analysis system 100. The first function allows a user sitting at a terminal (not shown) to obtain a list of all the process control loops that can be tagged or associated with the loop analyst database 140. From this listing, the user may then select one or more process control loops and have its/their details displayed.

These details may include stored data from the loop analyst database 140, most recently collected data from the data collector 135 as it is being forwarded to the loop analyst database 140 or analysis results as calculated by the performance evaluator module 145 as well as designator data that includes sensor and activator names in that process control loop 102. By providing all of this data to the user, the GUI 150 allows the user to establish timetables for data collection and analysis.

The second function of the GUI 150 is the grouping of the process control loops 102 for evaluation. This function is useful when two or more control loops are related. As previously described, GUI 150 lists any set of all of the process control loops for which it receives data, and the group designators(s) that show which group each process control loop is a member of. The user may then add or remove process control loops from a selected group. It should be noted that a process control loop 102 may belong to more than one group.

The third function is the display of results of the performance evaluation(s) (executed by the performance evaluator 145) to the user. The display may include data from one or more individual control loops, a group of process control loops or a plurality of groups.

The fourth function is the capability to perform an evaluation using stored data. Suppose, raw data is stored into the loop analyst database 140 and evaluations are performed on this set of raw data every hour. The user may desire to check the status of a particular process control loop using last week's data over a two-hour period. The user can re-evaluate that process control loop through GUI 150 by requesting the performance evaluator 145 to perform the analysis using the previously stored data as selected by the user. Thus, GUI 150 gives the user great flexibility over the stored data in analyzing process control loops and groups of process control loops.

Configurator Module 155

The configurator module 155 configures other modules or elements within the loop analyst system 100. The configurator 155 allows the user of the loop analysis system 100 to interface with and in some cases configure the data historian 125. That is, if the user wants to reinstantiate the data historian 125, or modify an instantiated data historian 125, the user uses GUI 150 to enter commands to instruct the configurator 155 to reinstantiate or modify requests to the data historian 125 for particular types of data.

The configurator module 155 also may configure the sample collection database 130. Configurator 155 configures sample collection data 130 so that it knows which samples of data to store from the continuous stream of data received by the data historian 125. That is configurator 155 retrieves the timetable from loop analyst database 140 for taking samples (from the sample collection database 130) and configures the samples into a format consistent with the format accepted by the sample collection database 130.

Figure 4:
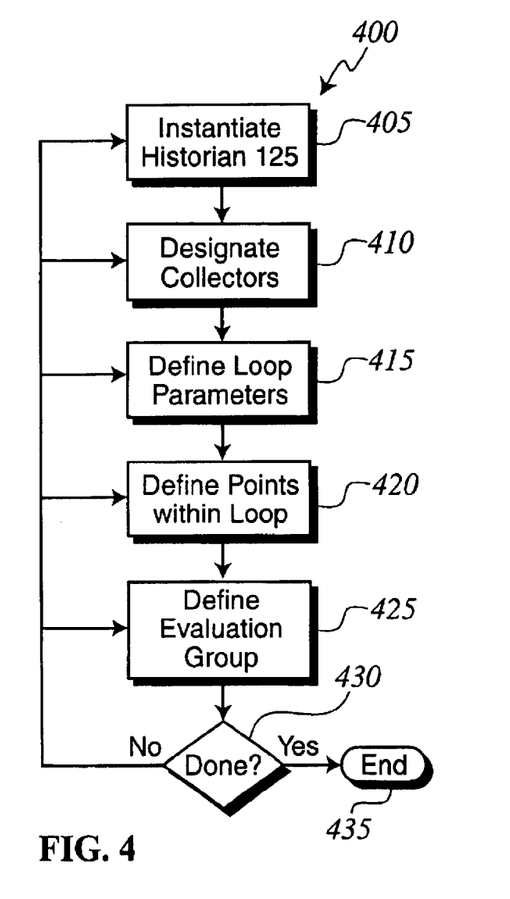
FIG. 4 is a flow chart of a process for initializing the system in FIG. 1.

FIG. 4 is a flowchart of a process for initializing the system shown in FIG. 1 so that data can be collected and analyzed. First, the data historian 125 is instantiated (step 405). The data historian 125 is instantiated by naming it in accordance with the computer or workstation it sits on as well as giving the historian itself a unique name. These designations are used to organize the historians. That is, a plurality of historians 125 may reside on one computer or workstation. By designating each historian 125 as being on a particular computer or workstation, the user may enter a query through GUI 150 to learn what historians are located on a particular computer/workstation. With this information the user may decide to add additional or remove existing historians to or from a particular computer/workstation. In addition, by organizing the historians by the computer/workstation they reside on, the user may run evaluations on the loops associated with the historians on a single computer/workstation in an effort to determine if the computer/workstation is operating properly or not.

Instantiating a historian also includes identifying the data it is to receive. More specifically, a historian may receive data associated with a plurality of process control loops 102 or from multiple points within a single process control loop 102. Each piece of data must be identified by at least a) the time it was received from the process control loop and b) a unique name so that the received data is associated with the process control loop from which it originates. Typically, these identifying characteristics are added by the process control system 115 to the data it receives. The setpoint associated with that particular piece of data also may be included. The data historian 125 then adds its own identifier to the data so that it is associated with the historian 125 that received it. An exemplary piece of designated data may comprise:

| Date/Time | Data Source Identifier | Historian Identifier | Numeric Value | Unit |
|---|---|---|---|---|
| Jan. 15, 2002 1:55:30 | Hygrometer #4-Loop #7 | Alpha | 30 | % |

After the historians have been instantiated, the data collectors 135 are initialized and designated (step 410). The data collectors 135 are associated, by name, with the server they reside on for the same reasons the historians are associated with the computers they reside on. In addition, each data collector 135 is associated with one or more data historian 125. Again, by organizing the collectors with historians, a user may look at the collective data received by the collector 135 to determine if the collector data or the workstation it resides upon is operating correctly. Thus, in one implementation another data table is established in the loop analyst database 140 that relates computers with historian modules 125.

Next the user establishes the parameters of the loop (step 415). A loop is defined by the type of data it is generating (e.g. flow, temperature, etc). In other implementations a loop also may be defined by its time constant, deal time, lowest variation and sample period. All of this data is entered into the loop analyst database 140 as it defines a loop.

Next the user defines the data points within a process control loop (step 420). As described above, a process control loop is a collection of elements coupled together to accomplish at least one task. The example given above was the adding the correct amount of water to a vat. Since most process control loops include for example, an actuator, a sensor, and a process control device (i.e. a process control system), it follows that a process control loop is defined by at least those elements. Therefore, the next step is to link these elements together by associating them as a process control loop. The user enters all of this data via GUI 150 and it is stored in the loop analyst database 140. In some implementations, it is possible to uniquely identify each sensor and actuator in the entire loop analyst system 100. In these implementations, the uniquely identified sensors and actuators are related to a process control loop via another data table in the loop analyst database 140. Exemplary entries in such a data table include:

| Name | Type | Loop Name |
|---|---|---|
| Hygrometer #4 | Sensor | Loop #7 |
| Actuator #16 | Actuator | Loop #7 |

In this implementation thus far described, the data points are associated with the historian 125 that collects them through the relational data tables. This relationship carries forward to link the data points with the data collectors 135 that receive the data points.

Next, the user defines an evaluation group (step 425). An evaluation group contains the process loop or loops it is to monitor as well as a designating name. An example of an evaluation group is as follows:

| Evaluation Group Name | Process Loop #1 | Process Loop #2 | ... | Process Loop #N | Time |
|---|---|---|---|---|---|
| Slurry Production | Dry Clay Output #45 | Water Output #12 | ... | Conveyer Belt #15 | M–F 12:00 |

The final field of this table includes the time the group is analyzed. If the user is done initializing the loop analyst system 100 (i.e., no more data points, loops or evaluation groups to define) the process ends (block 435). If the user needs to define additional data points (step 430), loops or evaluation groups, the process returns to the desired step (steps 405–425).

The configurator 155 and loop analyst database 140 operate in tandem to provide the user with increased flexibility in analyzing process control loops 102. The user may create new groups or edit loops into or out of a group very easily. The modified group may then be analyzed. The user also may easily add data points or remove data points from a process control loop. In addition, the storing of data taken from the process control loop allows a user to perform analysis on old data very easily. This flexibility allows a user to pinpoint errors in process control loops. That is, the user may easily establish and dynamically rearrange an analysis with an entire group of process control loops and then run the same analysis with one or more process control loops removed. This allows the user to determine what impact any given process control loop has over other process control loops. This also allows the user to identify interactions between process control loops as well as the information needed to fine tune a process control loop to operate to the overall system's peak performance.

Implementations of the herein described systems and methods also allow the user to view the data associated with the process control loops. The user may compare the data input into the performance evaluation module 145 with the results generated by loop performance evaluator 145. The user also is allowed to observe the data and not just the variances in the data, which improves the user's ability to make adjustments to process control loops 102.

Finally, the systems and methods described herein allow the user to generate reports and print out results and data. These reports may be generated at the end of an analysis or at the end of a time period, depending on user selections.

Figure 5:
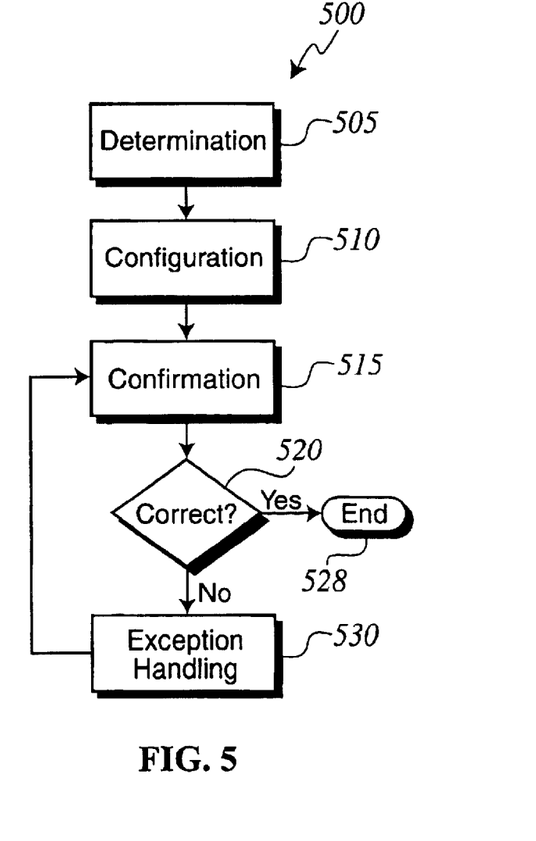
FIG. 5 is a flow chart of a process for instantiating the historian of FIG. 1.

FIG. 5 is a flow chart describing one optional implementation for configuring the loop analysis system 100 to communicate with one of many types of data historians, such as historian 125. In this implementation, the loop analysis system 100 is configured to communicate with the historian 125 so that data can be received from the historian 125 in the proper format. The process of configuring the loop analysis system 100 begins with the loop analysis system 100 making a determination as to the type of historian and in some cases the type of process control system 115 to which the loop analysis system 100 is connected (step 505). In the exemplary system shown in FIG. 1, the historian 125 is directly coupled to process control system 115. The loop analysis system 100 determines the characteristics (i.e. hardware and software) of the historian 125. In one implementation, this determination is accomplished by sending data requests to the historian 125 and analyzing the results received by the loop analysis system 100. An exemplary analysis process would include taking that data received and comparing it with stored expected result data until a match is found. In an alternate process, the data structure received from the historian 125 can be analyzed by the loop analysis system 100 in order to identify the component parts of the data structure. Additionally, tags associated with the received data structure may be analyzed to identify the component parts of the data structure.

Once the loop analysis system 100 determines the type of historian 125 it is coupled to, the loop analysis system 100 then configures itself to receive data from the historian 125 (step 510). In one example, configuration occurs by the loop analysis system 100 retrieving processes, functions and data structures from a library of stored processes, functions and data structures. The retrieved processes, functions and data structures are the ones necessary to receive, process and forward the data received from the historian 125. In another implementation, procedures and functions are specified for the data structures generated by the historian 125. Which specific procedures, functions etc are selected is determined by the results of the determination step (see step 505).

After the configuration process is complete (step 510), the loop analysis system 100 confirms that it has configured itself correctly (step 515) so that data for any designated process control loop 102 tracked by the historian 125 can be properly received and further processed by the loop analysis system 100. This is accomplished by the loop analysis system 100 sending an instruction and/or data to the historian. The historian 125 replies by forwarding a response to the loop analysis system 100, which then compares that response with a stored, expected response (step 520). If the response received by the loop analysis system 100 is the one it expects, then the loop analysis system 100 concludes it has properly configured itself to communicate with the particular type of historian and the configuration process ends (step 525).

If the response received by the loop analysis system 100 is incorrect, the loop analysis system 100 performs exception handling procedures (step 530). The exception handling procedures may include requesting additional information from the user via GUI 150 to assist with properly configuring the loop analysis system 100 to communicate with the historian 125, or the loop analysis system 100 itself may use a rule based analysis process to determine the proper configuration and reconfigure itself (step 515). While not shown in FIG. 5, a finite number of attempts by the loop analysis system 100 to reconfigure itself may be used to prevent the loop analysis system 100 from entering into an endless reconfiguration process.

A number of implementations have been described. Nevertheless, it will be understood that various modifications may be made. Accordingly, other implementations are within the scope of the following claims.

In an alternative implementation, the data output by the process control system 115 is stored in a database before it is forwarded to the data historian 125. In this implementation, the database is a log of all the data generated by sensor 106, the output data to actuator 110 and any response data output from actuator 110 that is handled by the process control system 115.

In some implementations, the individual modules are written in C++ code and the computers on which the modules are installed use the Windows NT® operating system. It should be noted that other languages and operating systems are contemplated for supporting the loop analyst system 100 and the historian 125. The individual modules may also be ASICs reinstalled on a mother or daughter board on a computer system.

What is claimed is:

1. An apparatus for evaluating real-time process control data comprising:
    a process control system configured to operate on the process control data and to identify the process control data as coming from the process control system for output as identified process control data;
    a data historian configured to determine an interface for communicating with the process control system, based on the identified process control data, and operable to collect the identified process control data from the process control system, using the interface, and to further identify the identified process control data as coming from the data historian for output as historian-specific process control data; and
    a loop analysis processor connected to the historian and configured to receive the historian-specific process control data and to thereby evaluate the process control data with respect to the process control system and the data historian.

2. The apparatus of claim 1 wherein the interface includes a configurable interface that allows the data historian to communicate with a plurality of process control systems that are each operable to output their respective identified process control data according to a different data format, and wherein the data historian is operable to re-format at least a first one of the different data formats into a second data format that is compatible with the loop analysis processor, for inclusion in the historian-specific process control data.

3. The apparatus of claim 1 wherein the interface includes a plurality of configurable interfaces that allows the data historian to simultaneously communicate with a plurality of process control systems that are each operable to output their respective identified process control data according to a different data format, and wherein the data historian is operable to re-format at least a first one of the different data formats into a second data format that is compatible with the loop analysis processor, for inclusion in the historian-specific process control data.

4. The apparatus of claim 1 wherein the data historian includes multiple configurable interfaces that allow the data historian to collect data from multiple process control systems.

5. The apparatus of claim 1 wherein the loop analysis processor includes a data collection module configured to interface with the data historian to retrieve the historian-specific process control data from the data historian.

6. The apparatus of claim 1 wherein the loop analysis processor includes a configurator module operable to configure the data historian to re-format the identified process control data from a first data format to a second data format that is compatible with the loop analysis processor, such that the process control data is included within the historian-specific process control data in the second data format.

7. The apparatus of claim 6 wherein the configurator module sends requests for historian-specific process control data from the loop analysis processor to the data historian.

8. The apparatus of claim 1 wherein the loop analysis processor includes a database for storing the historian-specific process control data collected by the data historian.

9. The apparatus of claim 8 wherein the loop analysis processor includes a data collection module configured to retrieve the historian-specific process control data from the data historian and store the historian-specific process control data in the database.

10. The apparatus of claim 9 wherein the loop analysis processor includes a performance evaluator module configured to receive the historian-specific process control data from the database and to analyze the historian-specific process control data.

11. The apparatus of claim 10 wherein the performance evaluator module analyzes process control data representing multiple control loops associated with the process control system.

12. A method for evaluating real-time process control data from a first process control loop comprising:
    configuring a data historian to communicate with a first process control system based on the identified process control data from the first process control system that is associated with the first process control loop;
    collecting the identified process control data from the first process control system;
    associating the identified process control data with the data historian, to thereby obtain historian-specific process control data;
    storing the historian-specific process control data in a database; and
    retrieving the stored historian-specific process control data for evaluation thereof using a loop analysis process.

13. The method of claim 12 wherein configuring the data historian includes selecting a first configurable interface within the data historian to communicate with the first process control system, based on the identified process control data.

14. The method of claim 12 further comprising configuring the data historian to communicate with a second process control system.

15. The method of claim 14 wherein configuring the data historian to communicate with a second process control system includes selecting a second configurable interface within the data historian to communicate with the second process control system.

16. The method of claim 12 wherein configuring the data historian includes selecting a configurable interface within the data historian to communicate with the first process control system and at least one other process control system.

17. The method of claim 12 wherein configuring the data historian includes selecting multiple configurable interfaces within the data historian to communicate with the first process control system and at least one other process control system.

18. The method of claim 12 wherein retrieving the stored historian-specific process control data further comprises retrieving the stored historian-specific process control data using a data collector module associated with the loop analysis process and storing the historian-specific process control data in a database associated with the loop analysis process.

19. The method of claim 12 wherein evaluating the historian-specific process control data further comprises selecting a subset of the historian-specific process control data and analyzing the subset using a performance evaluator module associated with the loop analysis process.

20. The method of claim 12 further comprising interfacing with the data historian using a configurator module associated with the loop analysis process to enable communication between the data historian and the loop analysis process.

* * * * *